United States Patent [19]
Craig

[11] Patent Number: 4,997,877
[45] Date of Patent: Mar. 5, 1991

[54] POLYACRYLATE DISPERSIONS PREPARED WITH A WATER-SOLUBLE CONJUGATED UNSATURATED MONOMER IN THE ABSENCE OF A PROTECTIVE COLLOID

[75] Inventor: Horace D. Craig, Hockessin, Del.

[73] Assignee: Hercules Incorporated, Wilmington, Del.

[21] Appl. No.: 164,320

[22] Filed: Mar. 4, 1988

Related U.S. Application Data

[63] Continuation-in-part of Ser. No. 884,822, Jul. 11, 1986.

[51] Int. Cl.$^5$ .................................. C08L 37/00
[52] U.S. Cl. .................................. 524/811; 524/812; 524/815; 524/817; 524/832
[58] Field of Search ............... 524/811, 812, 815, 817, 524/832

[56] References Cited

U.S. PATENT DOCUMENTS

| 3,306,871 | 2/1967 | Miller | 524/817 |
| 3,324,064 | 6/1967 | Fikentscher et al. | 524/817 |
| 3,637,563 | 1/1972 | Christena | 260/29.6 R |
| 4,265,796 | 5/1981 | Mueller-Mall et al. | 250/29.6 R |
| 4,558,092 | 12/1985 | Reinecke et al. | 524/817 |
| 4,659,771 | 4/1987 | Craig | 524/700 |

FOREIGN PATENT DOCUMENTS 74591 3/1978 Japan.
787703 11/1955 United Kingdom.
1278813 8/1969 United Kingdom.

Primary Examiner—Joseph L. Schofer
Assistant Examiner—J. M. Reddick
Attorney, Agent, or Firm—Mark D. Kuller

[57] ABSTRACT

Disclosed is an aqueous acrylic polymer dispersion containing no protective colloid and a dispersed phase comprised of a polymer of (a) one or more monomers selected from the group consisting of acrylic or methacrylic esters containing up to 22 carbon atoms and (b) 0.1% to 2%, by weight of the total monomers, of at least one water-soluble free-radically polymerizable monomer selected from the group consisting of linear or cyclic, nonaromatic sulfonic acids or sulfonic acid metal salts, amine salts, ammonium salts and quaternary ammonium salts having (i) 4 to 36 carbon atoms, (ii) conjugated unsaturation and (iii) a solubility of at least 0.4 gram per 100 ml of water at about 20° C. Also disclosed is a process for preparing the aqueous acrylic polymer dispersion by the aqueous emulsion polymerization, in the absence of a protective colloid and in the presence of a polymerization initiator, of (a) the acrylic or methacrylic ester monomer(s) and (b) the free-radically polymerizable monomer(s). The acrylic polymer latex is useful in the manufacture of latex paints, water-based inks, paper coatings, water-borne adhesives, such as pressure-sensitive adhesives, and as a binder for nonwoven materials.

13 Claims, No Drawings

POLYACRYLATE DISPERSIONS PREPARED WITH A WATER-SOLUBLE CONJUGATED UNSATURATED MONOMER IN THE ABSENCE OF A PROTECTIVE COLLOID

This application is a continuation-in-part of co-pending U.S. patent application No. 884,822, filed July 11, 1986.

This invention relates to a novel acrylic polymer latex and a novel process for preparing the same.

BACKGROUND OF THE INVENTION

Aqueous polyacrylic dispersions are aqueous dispersions of acrylic and methacrylic esters having a particle size in the range of about 0.05 micron up to about 0.5 micron. They are useful in the manufacture of latex paints, water-based inks, paper coatings, water-borne adhesives (such as pressure-sensitive adhesives), and as binders for nonwoven materials.

United Kingdom Patent Specification 1,278,813 indicates that it is known that stable dispersions or lattices can be obtained by the emulsion polymerization of acrylic or methacrylic esters in the presence of over 25%, based on the weight of the monomer, of vinyl acetate and a protective colloid such as hydroxyethyl cellulose (HEC). When less than 25% of the vinyl acetate comonomer is used, a stable latex cannot be obtained if the protective colloid is present.

Further, it is known, for instance, from U.S. Pat. No. 4,265,796, that the presence of protective colloids during the emulsion polymerization of acrylic esters frequently results in coagulated dispersions or in extremely viscous dispersions which are unsuitable for use as, e.g., paint binders.

The use of protective colloids has been avoided by using high levels of surfactants, e.g., about 5% to about 10%, based on the weight of monomer, in place of the protective colloid. However, the properties of the resultant latex, such as its film-forming ability, tensile strength, film-blocking resistance and water and solvent resistance are adversely affected.

British Patent Specification No. 787,703 discloses a process for preparing acrylic lattices by emulsion polymerization of acrylic and methacrylic esters in the presence of, among other things, sodium styrene sulfonate. The need for a protective colloid is avoided by the formation of an aqueous latex of an interpolymer formed from an alkyl ester of acrylic or methacrylic acid, acrylonitrile and/or methacrylonitrile, acrylic acid or a monomethyl or monophenyl acrylic acid, and a monovinylidene aromatic hydrocarbon or a nuclear halogen substitution product thereof. The disclosed process is extremely complex and subject to many specific and critical procedural restrictions.

Thus, there is a need for an aqueous acrylic polymer dispersion which can be prepared by a simple, yet effective emulsion polymerization process, which does not require the presence of protective colloids or high surfactant levels. Further, there is a need for a simple and effective process for the emulsion polymerization of acrylic and methacrylic esters in the absence of a protective colloid, and that does not require the presence of high surfactant levels. cl

SUMMARY OF THE INVENTION

Accordingly, this invention is directed to an aqueous acrylic polymer dispersion containing no protective colloid and a dispersed phase comprised of a polymer of (a) one or more monomers selected from the group consisting of acrylic or methacrylic esters containing up to 22 carbon atoms, and (b) 0.1% to 2%, by weight of the total monomers, of at least one water-soluble free-radically polymerizable monomer selected from the group consisting of linear or cyclic, nonaromatic sulfonic acids or sulfonic acid metal salts, amine salts, ammonium salts and quaternary ammonium salts having (i) 4 to 36 carbon atoms, (ii) conjugated unsaturation, and (iii) a solubility of at least 0.4 gram per 100 ml of water at about 20° C. (hereinafter "sulfonic acid monomer"), and the process for preparing the same. The process for preparing the aqueous acrylic polymer dispersion comprises the aqueous emulsion polymerization, in the absence of a protective colloid and in the presence of a polymerization initiator, of (a) the aforementioned acrylic or methacrylic ester monomers and (b) from about 0.1% to 2%, by weight of the total monomers, of at least one free-radically polymerizable sulfonic acid monomer. The aqueous polyacrylate dispersions of this invention impart significant improvement to the gloss and wet-abrasion resistance of latex paints formulated with them.

DETAILED DESCRIPTION OF THE INVENTION

The polyacrylate dispersions of this invention are shear-stable, and have low viscosity and good flow behavior. The particle size is from 0.05 micron up to 0.5 micron, typically from 0.05 micron up to 0.3 micron.

The monomers forming the polyacrylate lattices of this invention are defined with respect to specific terms. The term "conjugated unsaturation" means any two double or triple carbon-carbon bonds connected by one single carbon-carbon bond. Where one or more of the unsaturated groups is a double bond, the unsaturated carbon atom(s), may be unsubstituted or substituted by any group, such as an alkyl, aryl, alkaryl, carboxylic acid, carboxylic acid ester, hydroxyalkyl group, etc.

By "cyclic, nonaromatic" it is meant that the conjugated unsaturated moiety is present as part of a cyclic structure and will free radically polymerize in a 1,4 fashion (i.e., the cyclic structure is not a free radically inert structure such as phenyl, imidazolyl, pyrrolyl, etc.). Well known groups are 5 to 8 member rings containing all carbon atoms or one or more hetero atoms (nitrogen, oxygen or sulfur atoms). Preferred are five membered rings having as a fifth atom a carbon, sulfur or oxygen atom, the most preferred of which are cyclopentadienyl, furanyl and thiophenyl.

The term "water-soluble monomer", as used herein, means a monomer having a solubility of at least 0.4 gram per 100 ml of water at about 20° C., preferably a solubility of at least 1.0 gram per 100 ml of water at about 20° C. Only such water-soluble monomers possessing conjugated unsaturation are useful in the practice of this invention. Water-insoluble conjugated monomers, such as the alkyl esters of corresponding sulfonic acids and their derivatives, provide coagulated dispersions or dispersions possessing little, if any, mechanical stability.

When protective colloids are used during the aqueous emulsion polymerization of acrylic or methacrylic monomers, some of the protective colloid forms part of the resultant polymer chain, essentially forming a branched copolymer, and the remainder of the protective colloid is dispersed in the solution. By "containing no protective colloid" it is meant that a protective colloid is not contained as part of the acrylic polymer or the aqueous dispersion.

Preferably, the water-soluble monomer has 4 to 24 carbon atoms, and more preferably has 4 to 12 carbon atoms.

The sulfonic acid salts of this invention are selected from metal salts, amine salts, ammonium salts and quaternary ammonium salts. Exemplary salts include metal salts such as sodium, potassium, lithium, magnesium, calcium and zinc salts, the most preferred of which are sodium salts, ammonium salts, and mono, di, trialkyl and tetra alkyl ammonium salts.

Exemplary free-radical polymerizable sulfonic acid monomers of this invention are those having the following general formulae:

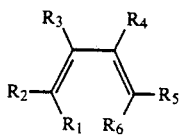
(I)

wherein $R_1$ and $R_6$, and, when present, $R_2$, $R_3$, $R_4$ and $R_5$, are H, —COOH, —COOR$_7$, —SO$_3$M or —R$_8$-SO$_3$M, or substituted or unsubstituted alkyl, aryl or alkaryl; at least one of $R_1$, $R_2$, $R_3$, $R_4$, $R_5$ and $R_6$ which is present is —SO$_3$M or —R$_8$SO$_3$M; $R_7$ is substituted or unsubstituted alkyl, aryl, or alkaryl; $R_8$ is substituted or unsubstituted alkylene (e.g., methylene, ethylene, etc.), arylene, aralkylene, alkylarylene, alkyl aryl and aryl alkyl; M is H, a stoichiometric equivalent of a metal ion in an amount sufficient to neutralize the —SO$_3$ charge, or an amine, ammonium or quaternary ammonium group; and one or both of the depicted double bonds may be replaced by a triple bond (in which case $R_2$ and $R_3$, $R_4$ and $R_5$, or $R_{2-5}$ will not be present); or

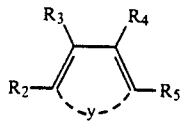
(II)

$R_2$, $R_3$, $R_4$ and $R_5$ are defined above; at least one of $R_2$, $R_3$, $R_4$ and $R_5$ is —SO$_3$M or —R$_8$SO$_3$M; $R_8$ and M are defined above; and y is one more substituted or unsubstituted carbon or hetero atoms forming a 5 to 8 membered ring. Preferably only one of $R_{1-6}$ of formula (I) and $R_{2-5}$ of formula (II) is —SO$_3$M or —R$_8$SO$_3$M.

Although the amount of the free-radically polymerizable sulfonic acid monomer used will vary depending on the desired viscosity, particle size and dispersion properties, generally from about 0.1 to about 2%, preferably from about 0.5% to about 1%, by weight of the total monomers content, is employed. These sulfonic acid monomers are readily copolymerizable with acrylic esters and methacrylic esters.

Exemplary acrylic and methacrylic esters per this invention include the substituted and unsubstituted alkyl, aryl, alkaryl, etc., esters of acrylic and methacrylic acid. Preferably, the acrylic esters and methacrylic esters used to make improved lattices according to the invention are alkyl esters in which the alkyl group contains up to 9 carbon atoms, and most preferably are methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, 2-ethylhexyl acrylate, 2-ethylhexyl methacrylate, t-butyl acrylate, t-butyl methacrylate, 3,3-dimethylbutyl acrylate and 3,3-dimethyl butyl methacrylate.

Other alkyl esters of acrylic and methacrylic acid that can be used, containing up to 22 carbon atoms, include decyl acrylate, decyl methacrylate, hendecyl methacrylate, lauryl methacrylate, tridecanyl methacrylate, myristyl acrylate, myristyl methacrylate, pentadecanyl methacrylate, arachidyl methacrylate, behenyl methacrylate, 10-methyl hendecanyl methacrylate and 2-ethyl-lauryl methacrylate.

The esters of acrylic and methacrylic acid that are suitable for the process according to the invention can be homopolymerized or copolymerized with each other, and can be copolymerized with one or more different comonomers capable of addition type polymerization, including unsubstituted and substituted styrene, acrylic or methacrylic acid, vinyl and vinylidene halides, allyl esters of saturated monocarboxylic acids, vinyl esters, vinyl ethers, dialkyl esters of monoethylenically unsaturated dicarboxylic acids, ethylenically unsaturated monocarboxylic and polycarboxylic acids and the anhydrides, nitriles, unsubstituted and substituted (including N-substituted) amides of all the said acids.

An "acrylic polymer" comprises at least 50%, by weight of the total monomers, of acrylic or methacrylic ester monomers. Thus comonomer, if present, is present in an amount from about 0.5% to less than 50%, by weight of the total monomers, preferably from about 0.5% to about 25%, most preferably from about 1% to about 10%. Reference to the "weight of the total monomers" herein means the total weight of the alkyl esters of acrylic and methacrylic acid, the free-radically polymerizable sulfonic acid monomers and all other comonomers.

The vinyl esters with which the acrylates and methacrylates used in the process according to the invention can be copolymerized include, e.g., aliphatic vinyl esters, such as vinyl formate, vinyl acetate, vinyl propionate, vinyl butyrate, vinyl isobutyrate, vinyl valerate, and vinyl caproate. The allyl esters of saturated monocarboxylic acids include, e.g., allyl acetate, allyl propionate and allyl lactate. Generally, these comonomers are used in amounts ranging up to about 10% by weight of the total monomers. The allyl esters of saturated monocarboxylic acids are generally used in relatively small amounts together with larger amounts of one or more other vinyl comonomers, particularly with aliphatic vinyl esters such as vinyl acetate.

The vinyl ethers with which the acrylates and methacrylates used in the process according to the invention can be copolymerized include methylvinyl ether, ethylvinyl ether and n-butylvinyl ether and typical vinyl ketones include methylvinyl ketone, ethylvinyl ketone and iso-butylvinyl ketone. The suitable dialkyl esters of monoethylenically unsaturated dicarboxylic acids include diethyl maleate, dibutyl maleate, dioctyl maleate, diisooctyl maleate, dinonyl maleate, diisodecyl maleate, ditridecyl maleate, dipropyl fumarate, dibutyl fumarate, dioctyl fumarate, diisooctyl fumarate, didecYl fumarate, dibutyl itaconate and dioctyl itaconate.

The monoethylenically unsaturated monocarboxylic acids that are suitable for use as comonomers include acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride.

Acrylonitrile, alpha-chloro-acrylonitrile and methacrylonitrile are among the corresponding nitriles of such acids that can be used as comonomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Suitable N-substituted amides include N-methylolacrylamide, N-methylolmethacrylamide, alkylated N-methylolacrylamides and N-methylolmethacrylamides, such as N-methoxymethylacrylamide and N-methoxymethyl-methacrylamide.

Amino compounds that can be used as comonomers include substituted and unsubstituted aminoalkyl acrylates, hydrochloride salts of amino monomers and methacrylates, such as beta-aminoethylacrylate, beta-aminoethylmethacrylate, di-methylaminomethylacrylate, beta-dimethylaminoethylacrylate, dimethylaminomethylmethacrylate. Hydroxy-containing monomers that are suitable include beta-hydroxyethylacrylate, beta-hydroxypropylacrylate, gamma-hydroxypropylacrylate and beta-hydroxyethylmethacrylate.

Anionic, cationic, nonionic and amphoteric emulsifiers and mixtures thereof known in the art may be used in the practice of this invention. Suitable emulsifiers include polyglycol ethers, sulfonated paraffin hydrocarbons, higher alkyl sulfates such as lauryl sulfate, alkali metal salts of fatty acids such as sodium stearate and sodium oleate, sulfuric acid esters of fatty alcohols, ethoxylated $C_{4-12}$ alkyl phenols and their sulfonation products and also sulfosuccinic acid esters. The emulsifiers are generally used in an amount of from 0.1 to 5.0%, by weight of the total monomers.

In general, the monomers may be polymerized by conventional aqueous emulsion techniques, preferably at from about 45° C. to about 95° C. in the presence of a free radical polymerization initiator, particularly a water-soluble peroxide, e.g., hydrogen peroxide, persulfates such as potassium, sodium and ammonium persulfates or perborates. Redox techniques can also be employed. The polymerization can be carried out by batch, semi-batch, or continuous processes.

In one method of carrying out this invention, all of the free-radically polymerizable sulfonic acid monomer(s), from about 1% to about 50% of the remaining monomer mixture (alkyl esters of acrylic and methacrylic acid, and comonomers) (more preferably from about 5% to about 25%) and one-half of the polymerization initiator are added in an initial reaction charge, the rest of the monomer mixture is then added continuously over a period from about 2 to about 4 hours. When half of the monomer mixture has been added, the remaining half of the polymerization initiator is added and the reaction is continued until polymerization is complete. The continuous addition of any reaction ingredient or ingredients is generally done over a period of from about 2 to about 4 hours. The inclusion of the free-radically polymerizable monomer(s) in the initial reactor charge is sufficient for the success of this invention, regardless of the method of addition of the rest of the reaction components.

In a preferred embodiment, a preemulsion is formed with all of the monomer(s) (including the free-radically polymerizable sulfonic acid monomer(s)), approximately 20% of the total water and emulsifier. Then, (1) the preemulsion, (2) a separate stream comprising the reducing agent and water, and (3) a third stream comprising the initiator and water are fed into a reactor containing water over a period of a few hours. The reactor is maintained at about 85° C. for about thirty minutes beyond the addition of the feed streams. Then, the reactor is cooled to room temperature and the product is filtered. In alternative embodiments of this preferred procedure, the free-radically polymerizable sulfonic acid monomer(s) may be added to any of the other feed streams or in the initial reactor charge.

The following examples demonstrate this invention and its advantages. Parts and percentages are by weight unless otherwise indicated.

EXAMPLE 1

Invention

This example illustrates the aqueous polyacrylate dispersions of this invention and how to prepare the same. A reaction vessel equipped with a stirrer, reflux condenser, thermometer, two feed ports and a water jacket was charged with 14.265 parts distilled water and 0.15 part CMC 7L (available from the Aqualon Company, Wilmington, DE, having a viscosity of 25–50 cps in a 2 wt % aqueous solution at 25° C.), with constant stirring (200 rpm). The temperature of the reactor was raised to 85° C. via circulating hot water at which time two separate streams were concurrently fed into the reactor according to the following scheme: (a) a mixture of 2.0 parts of a 4% aqueous solution of sodium formaldehyde sulfoxylate and 15.0 parts distilled water was fed into the reactor over 4 hours; (b) a pre-emulsion consisting of 0.15 part 90% aqueous t-butyl hydroperoxide, 0.8 parts of Alipal CO-436 (available from GAF Corporation, New York, N.Y.), 0.25 part of the sodium salt of 5-formyl-2-furansulfonic acid, 15.905 parts distilled water, and 49.0 parts of a mixture of butyl acrylate, methyl methacrylate, and methacrylic acid in a weight proportion of 50/50/1 respectively, were fed into the reactor over a 3 hour period. The reaction mixture temperature was maintained at 85° C. for fifteen minutes after the final feed was added, at which point it was allowed to cool to room temperature. Once it reached room temperature, it was filtered through cheese cloth and characterized.

EXAMPLE 2

This comparative example illustrates polymerization without a water-soluble conjugated unsaturated sulfonic acid salt per this invention. The procedures and formulations of Example 1 were used, except that the 5-formyl-2-furansulfonic acid sodium salt was not added to feed stream (b) and an additional quantity of distilled water, in an amount equivalent to the weight of the 5-formyl-2-furansulfonic acid sodium salt used in Example 1, was added to the initial charge.

EXAMPLE 3

Comparison

This example illustrates the preparation of aqueous polyacrylate dispersions in the presence of a water-insoluble conjugated unsaturated salt of carboxylic acid. A reaction vessel equipped with a stirrer, reflux condenser, thermometer, one feed port and a water jacket was charged with 52.35 parts distilled water, 1 part octylphenol ethoxylate having 10 moles of ethylene oxide, 0.15 part sodium dodecyl benzene sulfonate, 0.5 part sorbic acid, and 10 parts of a monomer mixture containing, by weight, 42.7 parts butyl acrylate, 56.8 parts methyl methacrylate and 0.5 part methacrylic acid. Stirring was continuous throughout the reaction. The temperature of the reactor was raised to 85° C. via circulating hot water, 1.0 part of a 5% aqueous solution of potassium persulfate was added batchwise and the addition of 34 parts of the above monomer mixture was started and continued uniformly over 2.5 hours. After one-half of the total monomer feed had been added, 1.0 part of a 5% aqueous solution of potassium persulfate was added batchwise. The reaction temperature was maintained at 85° C. for 2 hours after the addition of the monomer feed. The reaction mixture was then cooled by circulating cold water.

EXAMPLE 4
Comparison

This example illustrates the preparation of aqueous polyacrylate dispersions in the presence of a water-insoluble conjugated unsaturated salt of carboxylic acid. The procedure and formulation of Example 3 were used except that cinnamic acid was used instead of sorbic acid (Cinnamic acid is a monomer used in the process of British Patent Specification No. 787,703).

EXAMPLE 5
Comparison

This example illustrates the preparation of aqueous polyacrylate dispersions in the absence of a substantially completely water-soluble conjugated unsaturated sulfonic acid salt. The Procedure and formulation of Example 3 were used except that the 0.5 parts sorbic acid was omitted.

The properties of the aqueous polyacrylate dispersions of Examples 1-2 and of Comparative Examples 3-5 are set forth below in Table I.

TABLE I

| Example | pH | Solids, Wt. % | Viscosity, cps[1] | Particle Size, microns[2] | Shear Stability[3] |
|---|---|---|---|---|---|
| 1 | 4.2 | 50 | 100 | 0.41 | Yes |
| 2[4] | — | — | — | — | — |
| 3 | 2.8 | 46 | 37 | 0.11 | No[5] |
| 4 | 2.8 | 46 | 30 | 0.11 | No[5] |
| 5 | 2.8 | 46 | 32 | 0.12 | No[5] |

[1] Brookfield LVT viscosity at 25° C. before shearing the sample in a Waring blender for 5 minutes at the highest speed.
[2] Coulter Nanosizer particle size reading before shearing the sample in a Waring blender for 5 minutes at the highest speed.
[3] Five minutes in a Waring blender at highest speed.
[4] Reaction mixture gelled during synthesis. As a result, reaction could not be completed and characterization could not be carried out.
[5] Five seconds to failure.

Example 1 shows that this invention provides low viscosity and shear stable aqueous acrylic polymer dispersions having good flow behavior and low grit which can be formulated into latex paints having good abrasion resistance. The comparative examples shows that such aqueous acrylic polymer dispersions do not result without a free-radically polymerizable monomer such as that of the instant invention.

The free-radically polymerizable sulfonic acid monomers of the instant invention are especially useful in the presence of multivalent metal ions, such as the alkaline earth metal ions (e.g., calcium) and transition metal ions (e.g., zinc), which cause comparable carboxylic acid ester containing monomers to undergo crosslinking.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

I claim:

1. An aqueous acrylic polymer dispersion having a particle size of 0.05 micron up to 0.5 micron containing no protective colloid and a dispersed phase comprised of a polymer of (a) one or more monomers selected from the group consisting of an acrylic or methacrylic ester containing up to 22 carbon atoms and (b) 0.1% to 2%, by weight of the total monomers, of at least one water-soluble free-radically polymerizable monomer selected from the group consisting of linear and cyclic, nonaromatic sulfonic acids and sulfonic acid metal salts, amine salts, ammonium salts and quaternary ammonium salts having (i) 4 to 36 carbon atoms, (ii) conjugated unsaturation and (iii) a solubility of at least 0.4 gram per 100 ml of water at about 20° C.

2. The aqueous acrylic polymer dispersion of claim 1 wherein free-radically polymerizable monomer (b) is selected from the group consisting of the linear and cyclic, nonaromatic sulfonic acid metal salts, amine salts, ammonium salts and quaternary ammonium salts having (i) 4 to 36 carbon atoms, (ii) conjugated unsaturation and (iii) a solubility of at least 0.4 gram per 100 ml of water at about 20° C.

3. The aqueous acrylic polymer dispersion of claim 1 wherein the free-radically polymerizble monomer (b) has 4 to 12 carbon atoms.

4. The aqueous acrylic polymer dispersion of claim 2 wherein the free-radically polymerizable monomer (b) is selected from the group consisting of sodium, potassium, lithium, magnesium, calcium and zinc salts of sulfonic acid.

5. The aqueous acrylic polymer dispersion of claim 4 wherein the free-radically polymerizable monomer (b) is a sodium salt of sulfonic acid.

6. The aqueous acrylic polymer dispersion of claim 1 wherein the free-radically polymerizable monomer (b) has the general formula:

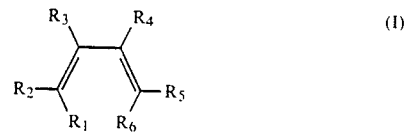

(I)

wherein $R_1$, $R_6$, $R_2$, $R_3$, $R_4$ and $R_5$, are H, —COOH, —COOR$_7$, —SO$_3$M or —R$_8$SO$_3$M, or substituted or unsubstituted, alkyl, aryl or alkaryl; at least one of $R_1$, $R_2$, $R_3$, $R_4$, $R_5$ and $R_6$ is —SO$_3$M or —R$_8$SO$_3$M; $R_7$ is substituted or unsubstituted alkyl, aryl, or alkaryl; $R_8$ is substituted or unsubstituted alkylene, arylene, aralkylene, alkylarylene and alkyl aryl; M is H, a metal ion in an amount sufficient to neutralize the —SO$_3$ charge, or an amine, ammonium or quaternary ammonium group; and one or both of the depicted double bonds may be replaced by a triple bond.

7. The aqueous acrylic polymer dispersion as claimed in claim 1 wherein the free-radically polymerizable monomer (b) has the general formula:

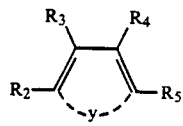
(II)

wherein $R_2$, $R_3$, $R_4$ and $R_5$ are H, —COOH, —COOR$_7$, —SO$_3$M or —R$_8$SO$_3$M, or substituted or unsubstituted, alkyl, aryl or alkaryl; at least one of $R_2$, $R_3$, $R_4$ and $R_5$ is —SO$_3$M or —R$_8$SO$_3$M; $R_7$ is substituted or unsubstituted alkyl, aryl, or alkaryl; $R_8$ is substituted or unsubstituted alkylene, arylene, aralkylene, alkylarylene and alkyl aryl; M is H, a metal ion in an amount sufficient to neutralize the —SO$_3$ charge, or an amine, ammonium or quaternary ammonium group; and y is one or more substituted or unsubstituted carbon or hetero atoms, forming a 5 to 8 membered ring.

8. The aqueous acrylic polymer dispersion of claim 7 wherein only one of $R_2$, $R_3$, $R_4$ and $R_5$ is —SO$_3$M or —R$_8$SO$_3$M and M is a sodium ion or an ammonium group.

9. The aqueous acrylic polymer dispersion of claim 8 wherein y is a substituted or unsubstituted carbon atom, a sulfur atom or an oxygen atom forming a 5 membered ring.

10. The aqueous acrylic polymer dispersion of claim 8 wherein only one of $R_2$, $R_3$, $R_4$ and $R_5$ is —SO$_3$M or —R$_8$SO$_3$M.

11. The aqueous acrylic polymer dispersion as claimed in claim 1 wherein the acrylic esters and methacrylic esters are alkyl acrylates or methacrylates containing up to 10 carbon atoms.

12. The aqueous acrylic polymer dispersion of claim 1 wherein the free-radically polymerizable monomer (b) has a solubility of at least 1.0 grams per 100 ml of water at about 20° C.

13. The aqueous acrylic polymer dispersion of claim 6 wherein only one of $R_1$, $R_2$, $R_3$, $R_4$, $R_5$ and $R_6$ is —SO$_3$M or —R$_8$SO$_3$M and M is a sodium ion or ammonium group.

* * * * *

UNITED STATES PATENT AND TRADEMARK OFFICE
CERTIFICATE OF CORRECTION

PATENT NO. : 4,997,877
DATED : March 5, 1991
INVENTOR(S) : Daniel H. Craig (Case 5-10)

It is certified that error appears in the above-identified patent and that said Letters Patent is hereby corrected as shown below:

Col. 1, line 21, "lattices" should read -- latices --;

Col. 1, line 43, "lattices" should read -- latices --;

Col. 1, line 63, "cl" should be omitted;

Col. 2, line 8, "quaternarY" should read -- quaternary --;

Col. 2, line 31, "lattices" should read -- latices --;

Col. 2, line 41, "Present" should read -- present --;

Col. 3, line 62, "lattices" should read -- latices --;

Col. 4, line 62, "didecYl" should read -- didecyl --; and

Col. 7, line 36, "Procedure" should read -- procedure --.

Signed and Sealed this

Twenty-ninth Day of September, 1992

Attest:

DOUGLAS B. COMER

*Attesting Officer*     *Acting Commissioner of Patents and Trademarks*